Oct. 1, 1929.  M. W. McCONKEY  1,729,887
BRAKING SYSTEM
Filed June 13, 1925   2 Sheets-Sheet 1

INVENTOR
Montgomery W. McConkey

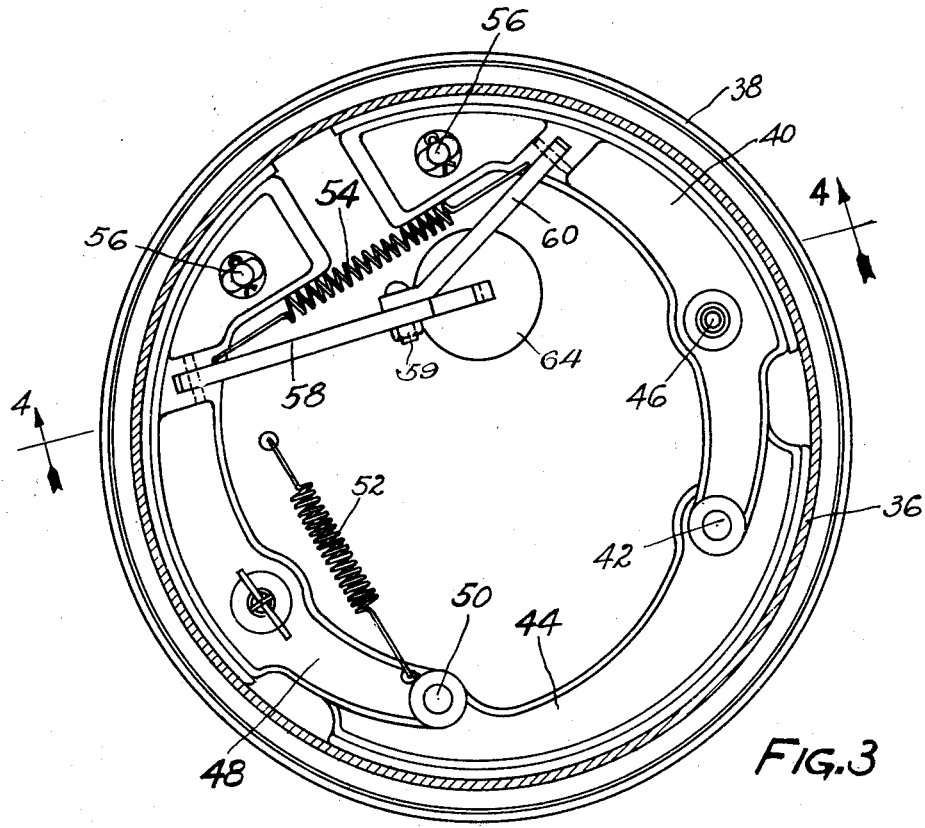
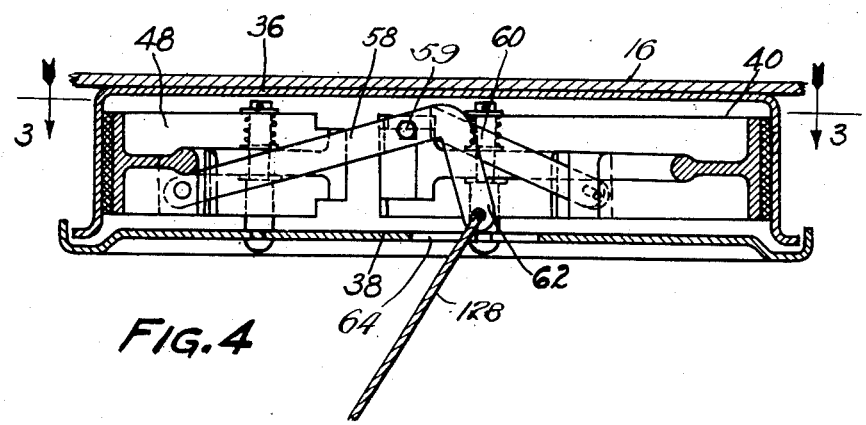

Patented Oct. 1, 1929

1,729,887

UNITED STATES PATENT OFFICE

MONTGOMERY W. McCONKEY, OF CHICAGO, ILLINOIS, ASSIGNOR TO BENDIX BRAKE COMPANY, OF CHICAGO, ILLINOIS, A CORPORATION OF ILLINOIS

BRAKING SYSTEM

Application filed June 13, 1925. Serial No. 36,848.

This invention relates to brakes and is illustrated as a novel system of brakes for an automobile chassis. An object of the invention is to secure reliable but inexpensive connections for operating brakes on the swivelled wheels. To this end the brakes are operated by a novel linkage, shown as a toggle having an operating part movable in applying the brake substantially into the swivelling axis of the wheel, and preferably operated by a cable or other tension element connected to the operating part.

If it is desired to vary the braking pressure when the wheel is swivelled, the joint is arranged when the brake is applied slightly at one side of the axis,—on the opposite side from the wheel in the illustrated arrangement, in order to relieve the pressure on the brake when the wheel is on the outer side of a turn. While especially intended for brakes on swivelled wheels, the novel brake-operating linkage is also useful for brakes of other sorts.

The above and other objects and features of the invention, including various novel combinations of parts and desirable particular constructions, will be apparent from the following description of two illustrative embodiments shown in the accompanying drawings, in which:

Figure 3 is a section just inside the left front wheel, vertically through the brake;

Figure 4 is a section on the line 4—4 of Figure 3, showing the toggle in bottom plan.

Figure 1:
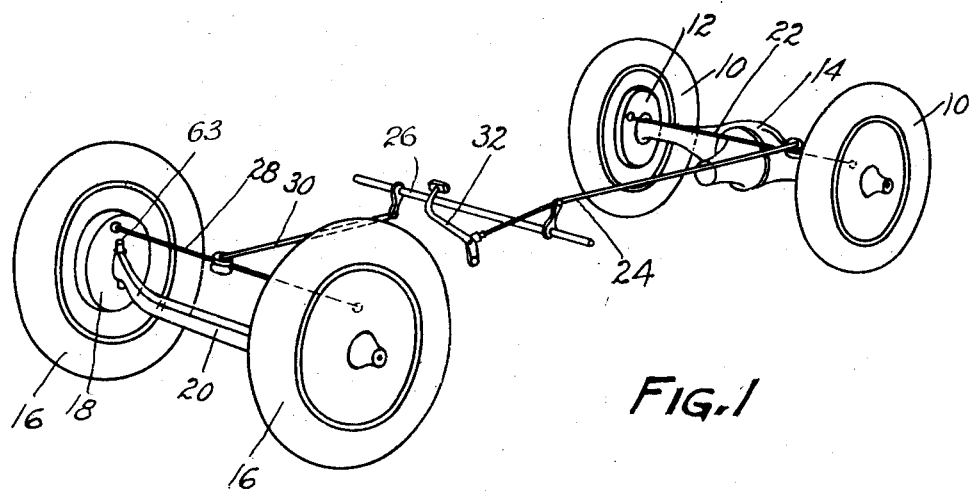
Figure 1 is a diagrammatic perspective view showing one arrangement of the operating connections on an automobile chassis.

In the arrangement of Figure 1, the chassis comprises rear wheels 10 having brakes 12, supporting the rear axle 14, and front wheels 16 having brakes 18 and swivelled by the usual king pin or the like at the ends of the front axle 20. The rear brakes 12 are operated by a tension element such as a cable 22 engaged by an equalizing pulley at the end of a link 24, operated by an arm on a cross shaft 26, and the front brakes 18 are operated by a tension element such as a cable 28 engaged by an equalizing pulley on the end of a link or cable 30 also connected to an arm on shaft 26. Shaft 26 is rocked in applying the brakes by a pedal 32.

Figure 2:
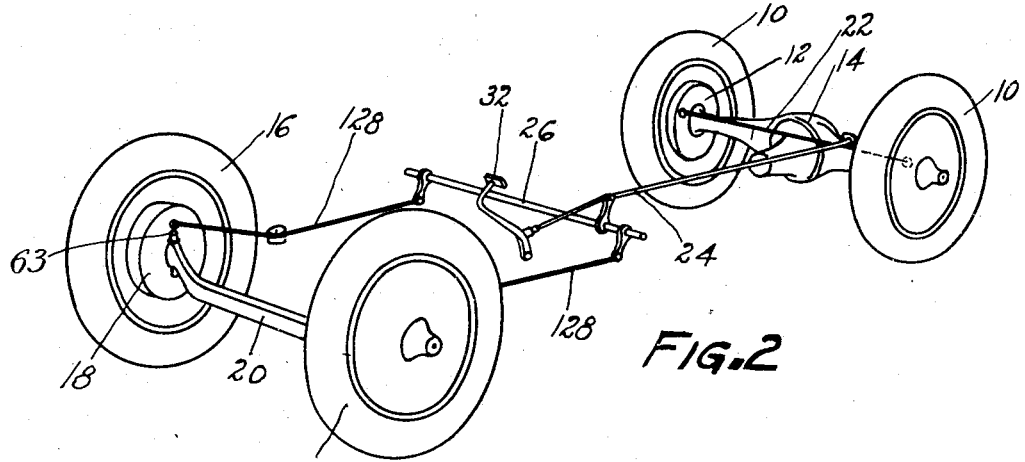
Figure 2 is a similar view showing the arrangement when the outer brake is to be relieved on a turn.

The arrangement of Figure 2 differs from that of Figure 1 in that the front brakes are not equalized against each other, but are separately operated by tension elements shown as cables 128 connected to arms on shaft 26. Preferably cables 128 pass over pulleys 34 on the chassis frame (not shown) approximately at the rear ends of the front springs (not shown), so that they approach the front brakes approximately at an angle of 45°.

As shown in Figure 3, illustrating one particular form of brake which may be used, each brake may include a drum 36 rotating with the wheel, and a stationary support or backing plate 38. Between the drum and backing plate is arranged an expansible friction device, which may include a reverse shoe 40 anchored at 42, a forward shoe 44 pivoted at 50 to the free end of shoe 48 and anchored at 46. Anchor 46 passes through a relatively large opening in shoe 40, and anchor 42 passes through a relatively large opening in shoe 44. Springs 52 and 54 urge the shoes away from the drum, and "steady-rests" 56 position the free ends of the shoes laterally.

The particular linkage shown is a toggle made up of a link 58 pivoted at one end to shoe 48, and pivotally connected at 59 to one end of a link 60 which at its other end is pivoted to shoe 40. The end of link 58 is bent around to form an operating part 62, arranged to be pivotally connected to the end of one of the cables, and which in the case of a front brake is movable in the dotted arc "A" (Figure 5) to a position substantially in the swivelling axis of the wheel, i. e. the axis of the king-pin 63 of the wheel. An opening 64 in backing plate 38 is provided for part 62.

Figure 5:
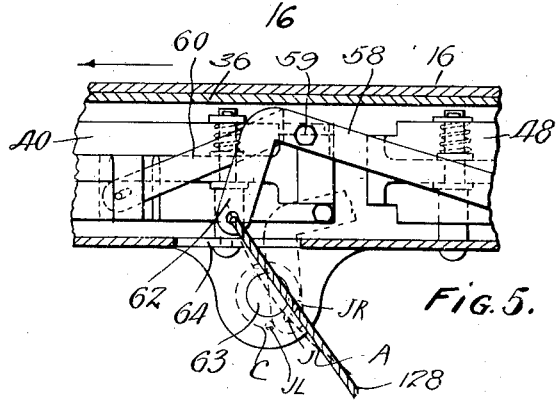
Figure 5 is a diagram representing a top plan view of the right front wheel and brake, and illustrating the manner of relieving the pressure on the outer brake on a turn.

When it is desired to vary the braking when the wheel is swivelled, the joint between cable 128 and part 62 is not exactly in the swivelling axis when the brake is applied, but slightly at one side of that axis, one arrangement being illustrated diagrammatically in Figure 5. In this figure, the center of the circle "C" is at the swivelling axis, or axis of king-pin 63 and the wheel 16 is shown straight ahead. The joint between cable 128 and part 62 is, when the brake is applied, at the point "J", to which position it has moved along the dotted arc "A" passing through the swivelling axis. When the wheel is swivelled to the right, at which time it is on the outside of the turn, point "J" moves to "JR", slackening off on the cable and relieving the pressure on the brake. When the wheel is swivelled to the left, on the inner side of the turn, point "J" moves to "JL", tightening up on the cable and increasing the pressure on the brake.

According to an important feature of the invention, I prefer to adjust the parts in such a manner that in the normal application of the brakes the point "J" (Figure 5) moves along the dotted arc only to the swivelling axis, so that the brake is not ordinarily affected by swivelling the wheel. In an emergency, however, when the driver puts his back against the seat and tries to push the brake pedal through the floor board, the joint is moved on to the position shown in Figure 5, so as to insure that the outer brake will not lock if the car happens to be on a turn. It will be appreciated that the distances shown in Figure 5 are much exaggerated.

While illustrative embodiments of the invention have been described in detail, it is not my intention to limit its scope to those particular embodiments, or otherwise than by the terms of the appended claims.

I claim:

1. A vehicle having, in combination, a swivelled wheel having a brake, a linkage for operating the brake, and a tension element for operating the linkage, the joint between the tension element and the linkage when the brake is applied being so arranged with respect to the swivelling axis as to cause variation in the pressure on the brake when the wheel is swivelled.

2. A vehicle having in combination, a swivelled wheel having a brake, a linkage for operating the brake, and a tension element for operating the linkage, the joint between the tension element and the linkage when the brake is applied being on the opposite side of the swivelling axis from the wheel, so as to cause a decrease in the pressure on the brake when the wheel is swivelled to place it on the outer side of a turn.

3. A vehicle having, in combination, a swivelled wheel having an expanding brake, a toggle for expanding the brake, and a tension element for straightening the toggle to expand the brake, the joint between the tension element and the toggle when the brake is applied being on the opposite side of the swivelling axis from the wheel to relieve the pressure on the brake when the wheel is on the outer side of a turn.

4. A vehicle having, in combination, a swivelled wheel having an expanding brake, a toggle for expanding the brake, and a member for straightening the toggle to expand the brake, the joint between the said member and the toggle when the brake is applied being at one side of the swivelling axis to relieve the pressure on the brake when the wheel is on the outer side of a turn.

5. A vehicle having, in combination, a swivelled wheel having a brake, and brake operating means including parts movable in the normal operation of the brake to positions where the pressure on the brake is substantially unaffected by swivelling the wheel, and which parts are movable by a more vigorous application of the brake to positions where swivelling the wheel varies the pressure on the brake.

6. A vehicle having, in combination, a swivelled wheel having a brake, and brake operating means including parts movable in the normal operation of the brake to positions where the pressure on the brake is substantially unaffected by swivelling the wheel, and which parts are movable by a more vigorous application of the brake to positions where swivelling the wheel to place it on the outside of a turn decreases the pressure on the brake.

7. A vehicle having, in combination, a swivelled wheel having a brake, and brake operating means including a joint movable in the normal operation of the brake to a position substantially in the swivelling axis so that swivelling the wheel does not substantially affect the brake, and movable by a more vigorous operation of the brake to a position slightly at one side of the swivelling axis, so that swivelling the wheel to place it on the outside of a turn will relieve the pressure on the brake.

8. A vehicle having, in combination, a swivelled wheel having a brake, and brake operating means including a brake-applying device and a tension element having a joint movable in the normal operation of the brake to a position substantially in the swivelling axis so that swivelling the wheel does not substantially affect the brake, and movable by a more vigorous operation of the brake to a position on the opposite side of the swivelling axis from the wheel, so that swivelling the wheel to place it on the outside of a turn will relieve the pressure on the brake.

9. A vehicle having, in combination, swivelled front steering wheels having brakes, and connections arranged normally to operate the brakes substantially equally regardless of their angular positions with respect to their swivelling axes, said connections including levers and a tension element connected to each lever, the points of connection being movable at the will of the driver to positions outside of the swivelling axes to differentiate the action of the brakes when the wheels are swivelled to one side of their straight-ahead positions.

10. A vehicle having, in combination, swivelled front steering wheels having brakes, and connections arranged normally to operate the brakes substantially equally regardless of their angular positions with respect to their swivelling axes, said connections including levers and a tension element connected to each lever, the points of connection being movable at the will of the driver to positions outside of the swivelling axes to differentiate the action of the brakes when the wheels are swivelled to one side of their straight-ahead positions to brake the outer wheel less than the inner wheel.

11. A vehicle having, in combination, swivelled front steering wheels having brakes, and connections arranged normally to operate the brakes substantially equally regardless of their angular positions with respect to their swivelling axes, said connections including levers and a tension element connected to each lever, the points of connection being movable by a brake-applying pressure greater than normal to differentiate the action of the brakes when the wheels are swivelled to one side of their straight-ahead positions.

In testimony whereof I have hereunto signed my name.

MONTGOMERY W. McCONKEY.